(12) United States Patent
Kwak et al.

(10) Patent No.: US 11,102,805 B2
(45) Date of Patent: Aug. 24, 2021

(54) METHOD FOR TRANSMITTING AND RECEIVING DOWNLINK CONTROL INFORMATION AND APPARATUS THEREFOR

(71) Applicant: LG Electronics Inc., Seoul (KR)

(72) Inventors: Kyuhwan Kwak, Seoul (KR); Seungmin Lee, Seoul (KR); Yunjung Yi, Seoul (KR); Hyunho Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/763,651

(22) PCT Filed: Nov. 14, 2018

(86) PCT No.: PCT/KR2018/013888
§ 371 (c)(1),
(2) Date: May 13, 2020

(87) PCT Pub. No.: WO2019/098667
PCT Pub. Date: May 23, 2019

(65) Prior Publication Data
US 2020/0367276 A1    Nov. 19, 2020

Related U.S. Application Data

(60) Provisional application No. 62/587,436, filed on Nov. 16, 2017, provisional application No. 62/588,270, (Continued)

(51) Int. Cl.
*H04W 72/12* (2009.01)
*H04L 1/00* (2006.01)
*H04L 1/08* (2006.01)

(52) U.S. Cl.
CPC ....... *H04W 72/1289* (2013.01); *H04L 1/0016* (2013.01); *H04L 1/0017* (2013.01); *H04L 1/0038* (2013.01); *H04L 1/08* (2013.01)

(58) Field of Classification Search
None
See application file for complete search history.

(56) References Cited

U.S. PATENT DOCUMENTS

2014/0185534 A1    7/2014  Vos
2015/0270931 A1    9/2015  Sun
(Continued)

FOREIGN PATENT DOCUMENTS

| EP | 3744028 A1 | 12/2020 |
|---|---|---|
| WO | 2019143985 A1 | 7/2019 |
| WO | 2020064730 A1 | 4/2020 |

OTHER PUBLICATIONS

R1-1717381: 3GPP TSG RAN WG1 Meeting 90bis, Prague, Czech Republic, Oct. 9-13, 2017, Intel Corporation, "Ultra-reliability for NR PDCCH," (6 Pages).
(Continued)

*Primary Examiner* — Anh Vu H Ly
(74) *Attorney, Agent, or Firm* — Dentons US LLP

(57) ABSTRACT

Disclosed is a method for a terminal to receive downlink control information (DCI) in a wireless communication system. In particular, the method comprises: receiving information related to a mapping relation between a blind decoding candidate index and a redundancy version (RV) for DCI; detecting DCIs repeatedly transmitted in a plurality of blind decoding candidates; acquiring an RV value of the DCI on the basis of the information and the index of the blind decoding candidate in which the DCI has been detected, and acquiring data scheduling information included in the DCI on the basis of the RV value.

14 Claims, 13 Drawing Sheets

Related U.S. Application Data filed on Nov. 17, 2017, provisional application No. 62/634,706, filed on Feb. 23, 2018.

(56) References Cited

U.S. PATENT DOCUMENTS

| | | |
|---|---|---|
| 2017/0272199 A1 | 9/2017 | Dinan |
| 2018/0006863 A1* | 1/2018 | Li .................... H04L 29/06 |
| 2018/0123744 A1* | 5/2018 | Nogami ............ H04L 1/1854 |
| 2019/0141695 A1* | 5/2019 | Babaei ............... H04L 5/001 |
| 2019/0191424 A1* | 6/2019 | Wang ................ H04W 92/18 |
| 2019/0372719 A1* | 12/2019 | Talarico ........... H04W 72/042 |
| 2020/0177306 A1* | 6/2020 | Choi ................. H04L 1/0072 |
| 2020/0229152 A1* | 7/2020 | Park ................. H04W 72/042 |
| 2020/0288482 A1* | 9/2020 | Yi .................... H04L 5/0053 |

OTHER PUBLICATIONS

R1-1717161:3GPP TSG-RAN WG1 Meeting #90bis, Prague, Czech Republic, Oct. 9-13, 2017,Ericsson, "DCI for sTTI scheduling," (4 Pages).

R-1717500:3GPP TSG RAN WG1, Meeting 90bis, Prague, CZ, Oct. 9-13, 2017,vivo,"UL data transmission procedure," (13 pages).

R-1715888:3GPP TSG RAN WG1, Meeting NR#3, Nagoya, Japan, Sep. 18-21, 2017,LG Electronics,"Discussion on UL data transmission procedure," (11 pages).

R-1716106:3GPP TSG RAN WG1 Meeting NR Ad-Hoc#3, Nagoya, Japan, Sep. 18-21, 2017, NTT DOCOMO, INC., "Signalling design for CBG-based (re)transmission," (7 Pages).

\* cited by examiner (A) CONTROL-PLANE PROTOCOL STACK (B) USER-PLANE PROTOCOL STACK (a) 1TX or 2TX (b) 4 TX

METHOD FOR TRANSMITTING AND RECEIVING DOWNLINK CONTROL INFORMATION AND APPARATUS THEREFOR

This application is a National Stage Entry of International Application No. PCT/KR2018/013888 filed Nov. 14, 2018, which claims the benefit of U.S. Provisional Application Nos. 62/587,436 filed Nov. 16, 2017; 62/588,270 filed Nov. 17, 2017 and 62/634,706 filed Feb. 23, 2018, the contents of which are all hereby incorporated by reference herein in their entirety.

TECHNICAL FIELD

The present disclosure relates to a method of transmitting and receiving downlink control information and apparatus therefor, and more particularly, to a method of transmitting and receiving different downlink control information for data with different target quality of service (QoS) requirements and apparatus therefor.

BACKGROUND ART

As more and more communication devices demand greater communication traffic as times go by, the next generation 5G system, which is wireless broadband communication, is being required over the existing LTE systems. In the next generation 5G system named new RAT, communication scenarios are classified into Enhanced Mobile Broadband (eMBB), Ultra-reliability and low-latency communication (URLLC), Massive Machine-Type Communications (mMTC), etc.

Here, eMBB is the next generation mobile communication scenario having such properties as high spectrum efficiency, high user experienced data rate, high peak data rate and the like, URLLC is the next generation mobile communication scenario having such properties as ultra-reliable, ultra-low latency, ultra-high availability and the like (e.g., V2X, emergency service, remote control), and mMTC is the next generation mobile communication scenario having such properties as low cost, low energy, short packet, massive connectivity and the like (e.g., IoT).

DISCLOSURE

Technical Problem

The object of the present disclosure is to provide a method of transmitting and receiving downlink control information and apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, provided is a method of receiving downlink control information (DCI) by a user equipment (UE) in a wireless communication system. The method may include receiving information on a mapping relation between blind decoding candidate indices and redundancy versions (RVs) for the DCI, detecting the DCI repeatedly transmitted on a plurality of blind decoding candidates, obtaining the RV value of the DCI based on the information and the index of a blind decoding candidate in which the DCI is detected, and obtaining data scheduling information included in the DCI based on the RV value.

In this case, the data scheduling information may be obtained by combining the repeatedly transmitted DCI based on an incremental redundancy (IR) scheme.

The RV value may be obtained based on a modulo operation between the index of the blind decoding candidate in which the DCI is detected and the number of values available for the RV value of the DCI.

When the plurality of blind decoding candidates are included in a plurality of control resource block sets, the RV value may be obtained by further considering information on a control resource block set in which the DCI is detected.

The number of a plurality of blind decoding candidates for each aggregation level (AL) in a transmission unit for repeatedly transmitting the DCI may be determined based on the number of transmission time intervals (TTIs) included in the transmission unit and the number of blind decoding candidates for each AL included in one TTI.

Blind decoding candidates in which the DCI is capable of being detected may be determined based on the target quality of service (QoS) of data scheduled by the DCI.

In another aspect of the present disclosure, provided is a communication device for receiving DCI in a wireless communication system. The communication device may include a memory and a processor connected to the memory. The processor may be configured to receive information on a mapping relation between blind decoding candidate indices and RVs for the DCI, detect the DCI repeatedly transmitted on a plurality of blind decoding candidates, obtain the RV value of the DCI based on the information and the index of a blind decoding candidate in which the DCI is detected, and obtain data scheduling information included in the DCI based on the RV value.

In this case, the data scheduling information may be obtained by combining the repeatedly transmitted DCI based on an IR scheme.

The RV value may be obtained based on a modulo operation between the index of the blind decoding candidate in which the DCI is detected and the number of values available for the RV value of the DCI.

When the plurality of blind decoding candidates are included in a plurality of control resource block sets, the RV value may be obtained by further considering information on a control resource block set in which the DCI is detected.

The number of a plurality of blind decoding candidates for each AL in a transmission unit for repeatedly transmitting the DCI may be determined based on the number of TTIs included in the transmission unit and the number of blind decoding candidates for each AL included in one TTI.

Blind decoding candidates in which the DCI is capable of being detected may be determined based on the QoS of data scheduled by the DCI.

In still another aspect of the present disclosure, provided is a method of transmitting DCI by a base station in a wireless communication system. The method may include transmitting information on a mapping relation between blind decoding candidate indices and RVs for the DCI and repeatedly transmitting the DCI on a plurality of blind decoding candidates. The index of a blind decoding candidate on which the DCI is transmitted may be determined based on the information and the RV value of the DCI.

In a further aspect of the present disclosure, provided is a communication device for transmitting DCI in a wireless communication. The communication device may include a memory and a processor connected to the memory. The processor may be configured to transmit information on a mapping relation between blind decoding candidate indices and RVs for the DCI and repeatedly transmit the DCI on a plurality of blind decoding candidates. The index of a blind decoding candidate on which the DCI is transmitted may be determined based on the information and the RV value of the DCI.

Advantageous Effects

According to the present disclosure, the target QoS requirement of data scheduled by received DCI may be efficiently obtained by identifying DCIs scheduling data with different target QoS requirements based on the following embodiments of the present disclosure.

The effects that can be achieved with the present disclosure are not limited to what has been particularly described hereinabove and other advantages not described herein will be more clearly understood by persons skilled in the art from the following detailed description of the present disclosure.

DESCRIPTION OF DRAWINGS

FIGS. 10 to 12 are flowcharts for explaining the operations of a user equipment (UE) and a base station (BS) according to the embodiments of the present disclosure.

BEST MODE

Figure 1:
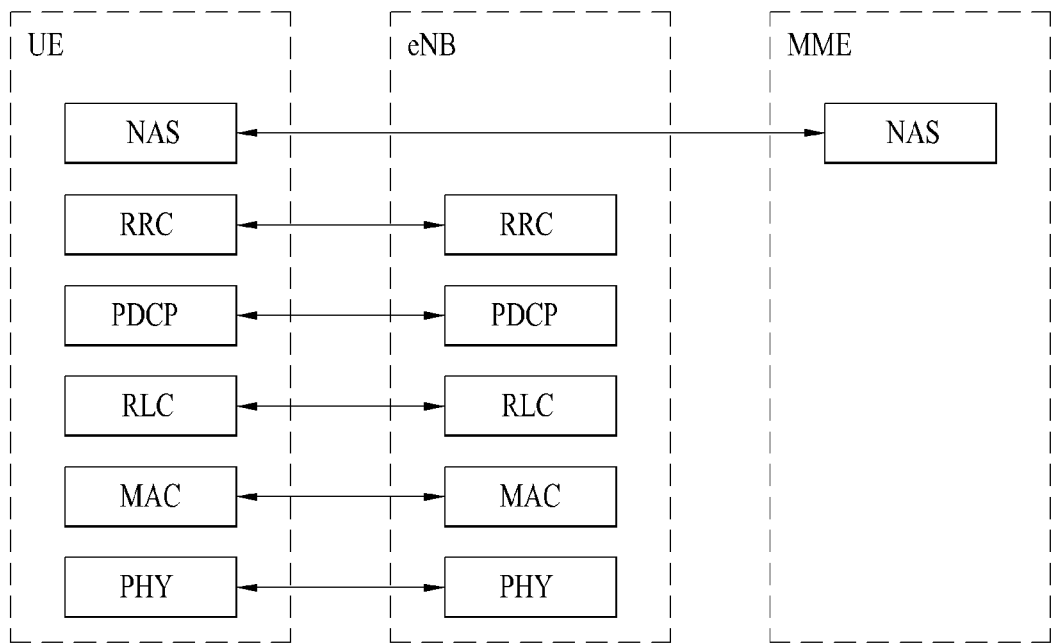
FIG. 1 is a view illustrating the control-plane and user-plane architecture of radio interface protocols between a user equipment (UE) and an evolved UMTS terrestrial radio access network (E-UTRAN) in conformance to a 3rd generation partnership project (3GPP) radio access network standard.
Figure 1:
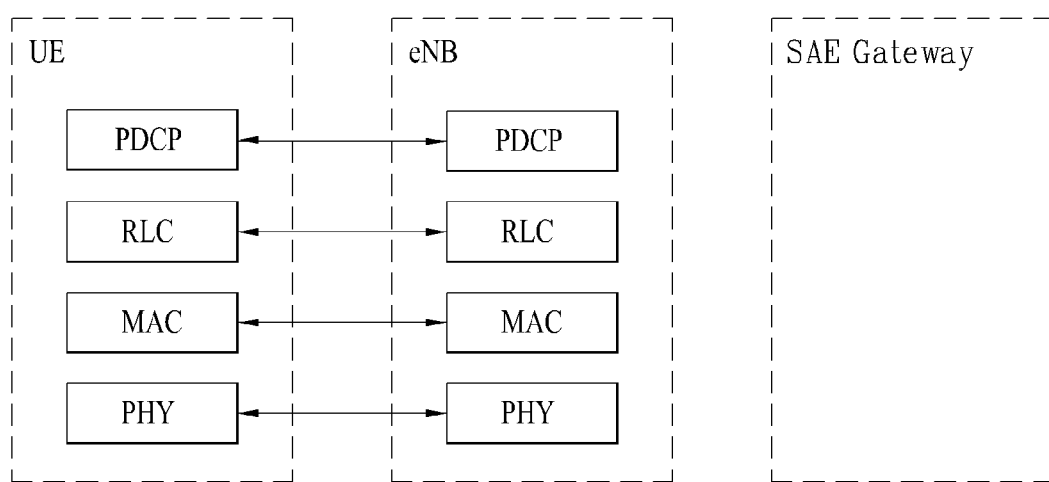

The configuration, operation, and other features of the present disclosure will readily be understood with embodiments of the present disclosure described with reference to the attached drawings. Embodiments of the present disclosure as set forth herein are examples in which the technical features of the present disclosure are applied to a 3rd generation partnership project (3GPP) system.

While embodiments of the present disclosure are described in the context of long term evolution (LTE) and LTE-advanced (LTE-A) systems, they are purely exemplary. Therefore, the embodiments of the present disclosure are applicable to any other communication system as long as the above definitions are valid for the communication system.

The term, base station (BS) may be used to cover the meanings of terms including remote radio head (RRH), evolved Node B (eNB or eNode B), transmission point (TP), reception point (RP), relay, and so on.

The 3GPP communication standards define downlink (DL) physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals. An RS, also called a pilot signal, is a signal with a predefined special waveform known to both a gNode B (gNB) and a user equipment (UE). For example, cell specific RS, UE-specific RS (UE-RS), positioning RS (PRS), and channel state information RS (CSI-RS) are defined as DL RSs. The 3GPP LTE/LTE-A standards define uplink (UL) physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and a demodulation reference signal (DMRS) for a UL control/data signal, and a sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/negative acknowledgement (ACK/NACK)/DL data. Further, the PUCCH/PUSCH/PRACH refers to a set of time-frequency resources or a set of REs, which carry UL control information (UCI)/UL data/a random access signal. In the present disclosure, particularly a time-frequency resource or an RE which is allocated to or belongs to the PDCCH/PCFICH/PHICH/PDSCH/PUCCH/PUSCH/PRACH is referred to as a PDCCH RE/PCFICH RE/PHICH RE/PDSCH RE/PUCCH RE/PUSCH RE/PRACH RE or a PDCCH resource/PCFICH resource/PHICH resource/PDSCH resource/PUCCH resource/PUSCH resource/PRACH resource. Hereinbelow, if it is said that a UE transmits a PUCCH/PUSCH/PRACH, this means that UCI/UL data/a random access signal is transmitted on or through the PUCCH/PUSCH/PRACH. Further, if it is said that a gNB transmits a PDCCH/PCFICH/PHICH/PDSCH, this means that DCI/control information is transmitted on or through the PDCCH/PCFICH/PHICH/PDSCH.

Hereinbelow, an orthogonal frequency division multiplexing (OFDM) symbol/carrier/subcarrier/RE to which a CRS/DMRS/CSI-RS/SRS/UE-RS is allocated to or for which the CRS/DMRS/CSI-RS/SRS/UE-RS is configured is referred to as a CRS/DMRS/CSI-RS/SRS/UE-RS symbol/carrier/subcarrier/RE. For example, an OFDM symbol to which a tracking RS (TRS) is allocated or for which the TRS is configured is referred to as a TRS symbol, a subcarrier to which a TRS is allocated or for which the TRS is configured is referred to as a TRS subcarrier, and an RE to which a TRS is allocated or for which the TRS is configured is referred to as a TRS RE. Further, a subframe configured to transmit a TRS is referred to as a TRS subframe. Further, a subframe carrying a broadcast signal is referred to as a broadcast subframe or a PBCH subframe, and a subframe carrying a synchronization signal (SS) (e.g., a primary synchronization signal (PSS) and/or a secondary synchronization signal (SSS)) is referred to as an SS subframe or a PSS/SSS subframe. An OFDM symbol/subcarrier/RE to which a PSS/SSS is allocated or for which the PSS/SSS is configured is referred to as a PSS/SSS symbol/subcarrier/RE.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna port configured to transmit CRSs may be distinguished from each other by the positions of REs occupied by the CRSs according to CRS ports, antenna ports configured to transmit UE-RSs may be distinguished from each other by the positions of REs occupied by the UE-RSs according to UE-RS ports, and antenna ports configured to transmit CSI-RSs may be distinguished from each other by the positions of REs occupied by the CSI-RSs according to CSI-RS ports. Therefore, the term CRS/UE-RS/CSI-RS/TRS port is also used to refer to a pattern of REs occupied by a CRS/UE-RS/CSI-RS/TRS in a predetermined resource area.

FIG. 1 illustrates control-plane and user-plane protocol stacks in a radio interface protocol architecture conforming to a 3GPP wireless access network standard between a UE and an evolved UMTS terrestrial radio access network (E-UTRAN). The control plane is a path in which the UE and the E-UTRAN transmit control messages to manage calls, and the user plane is a path in which data generated from an application layer, for example, voice data or Internet packet data is transmitted.

A physical (PHY) layer at layer 1 (L1) provides information transfer service to its higher layer, a medium access control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in orthogonal frequency division multiple access (OFDMA) for downlink (DL) and in single carrier frequency division multiple access (SC-FDMA) for uplink (UL).

The MAC layer at layer 2 (L2) provides service to its higher layer, a radio link control (RLC) layer via logical channels. The RLC layer at L2 supports reliable data transmission. RLC functionality may be implemented in a function block of the MAC layer. A packet data convergence protocol (PDCP) layer at L2 performs header compression to reduce the amount of unnecessary control information and thus efficiently transmit Internet protocol (IP) packets such as IP version 4 (IPv4) or IP version 6 (IPv6) packets via an air interface having a narrow bandwidth.

A radio resource control (RRC) layer at the lowest part of layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a broadcast channel (BCH) carrying system information, a paging channel (PCH) carrying a paging message, and a shared channel (SCH) carrying user traffic or a control message. DL multicast traffic or control messages or DL broadcast traffic or control messages may be transmitted on a DL SCH or a separately defined DL multicast channel (MCH). UL transport channels used to deliver data from a UE to the E-UTRAN include a random access channel (RACH) carrying an initial control message and a UL SCH carrying user traffic or a control message. Logical channels that are defined above transport channels and mapped to the transport channels include a broadcast control channel (BCCH), a paging control channel (PCCH), a Common Control Channel (CCCH), a multicast control channel (MCCH), a multicast traffic channel (MTCH), etc.

Figure 2:
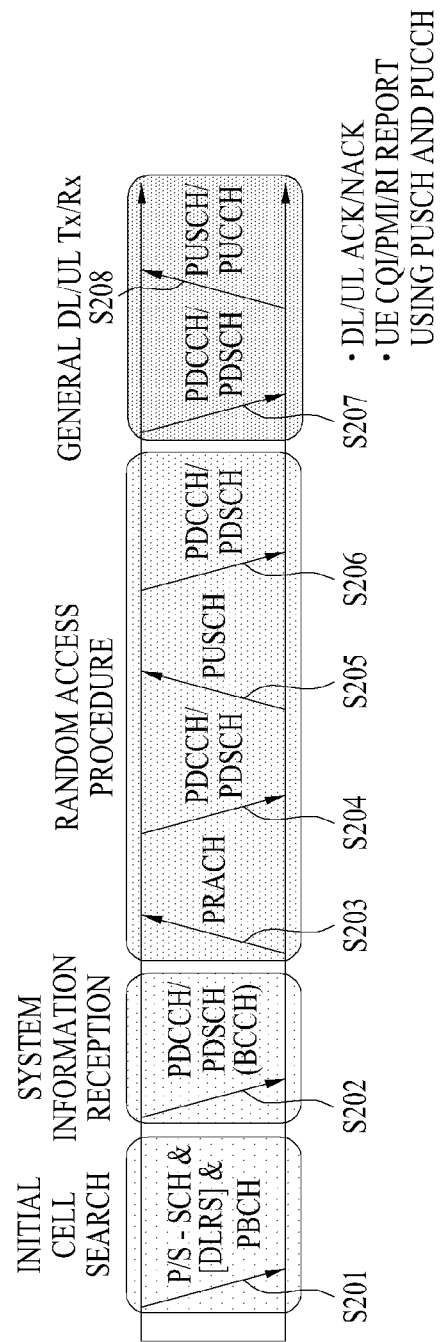
FIG. 2 is a diagram illustrating physical channels used in a 3GPP system and a general signal transmission method using the same.

FIG. 2 illustrates physical channels and a general method for transmitting signals on the physical channels in the 3GPP system.

Referring to FIG. 2, when a UE is powered on or enters a new cell, the UE performs initial cell search (S201). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB. Then the UE may acquire information broadcast in the cell by receiving a physical broadcast channel (PBCH) from the eNB. During the initial cell search, the UE may monitor a DL channel state by receiving a DownLink reference signal (DL RS).

After the initial cell search, the UE may acquire detailed system information by receiving a physical downlink control channel (PDCCH) and receiving a physical downlink shared channel (PDSCH) based on information included in the PDCCH (S202).

If the UE initially accesses the eNB or has no radio resources for signal transmission to the eNB, the UE may perform a random access procedure with the eNB (S203 to S206). In the random access procedure, the UE may transmit a predetermined sequence as a preamble on a physical random access channel (PRACH) (S203 and S205) and may receive a response message to the preamble on a PDCCH and a PDSCH associated with the PDCCH (S204 and S206). In the case of a contention-based RACH, the UE may additionally perform a contention resolution procedure.

After the above procedure, the UE may receive a PDCCH and/or a PDSCH from the eNB (S207) and transmit a physical uplink shared channel (PUSCH) and/or a physical uplink control channel (PUCCH) to the eNB (S208), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

Figure 3:
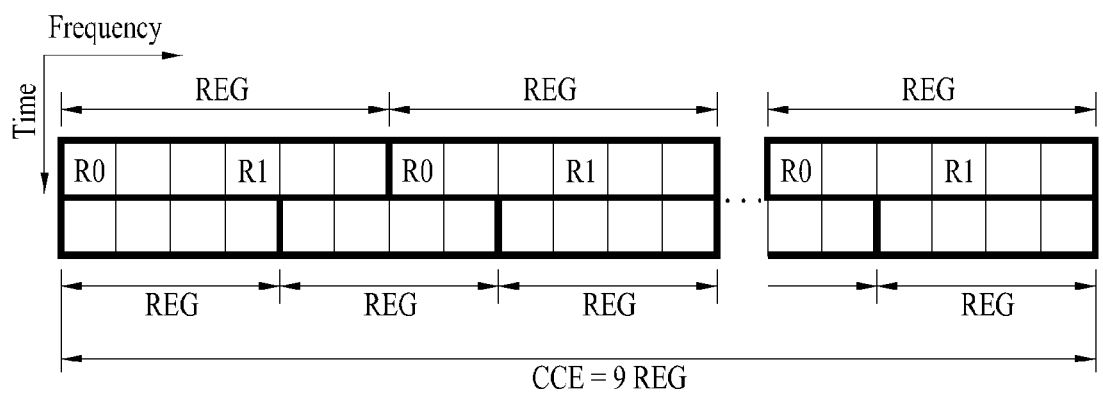
FIG. 3 is a diagram illustrating a resource unit used to configure a downlink control channel in the long term evolution (LTE) system.
Figure 3:
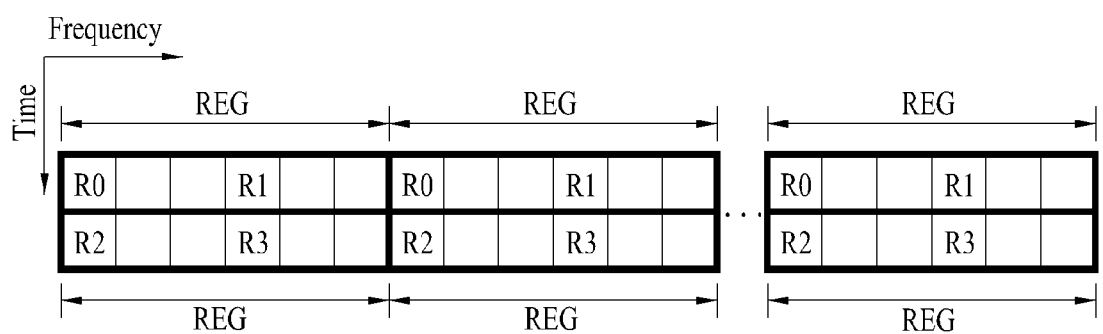

FIG. 3 illustrates a resource unit used to configure a downlink control channel in the LTE system. Specifically, FIG. 3(a) shows a case in which an eNB has one or two transmit antennas, and FIG. 3(b) shows a case in which an eNB has four transmit antennas. A reference signal (RS) pattern varies depending on the number of transmit antennas, but the same method is used to configure a resource unit for a control channel.

Referring to FIG. 3, the basic resource unit of a downlink control channel is a resource element group (REG). The REG includes four consecutive resource elements (REs) except an RS. In FIG. 3, the REG is represented by a bold line. A PCFICH and a PHICH include four REGs and three REGs, respectively. A PDCCH is configured on a control channel element (CCE) basis, and one CCE includes 9 REGs.

A UE may be configured to check $M^{(L)}$ ($\geq L$) CCEs, which are consecutive or arranged according to a specific rule, in order to check whether a PDCCH composed of L CCEs is transmitted to the UE. The value of L that the UE needs to consider to receive the PDCCH may be plural. A set of CCEs that the UE needs to check for the PDCCH reception is referred to as a search space. For example, Table 1 shows search spaces defined in the LTE system.

TABLE 1

| Type | Search space $S_k^{(L)}$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

In Table 3, CCE aggregation level L denotes the number of CCEs included in a PDCCH, $S_k^{(L)}$ denotes a search space at CCE aggregation level L, and $M^{(L)}$ denotes the number of PDCCH candidates that needs to be monitored in the search space at CCE aggregation level L.

The search space may be categorized into a UE-specific search space that only a specific UE is granted to access and a common search space that all UEs in a cell are granted to access. A UE monitors a common search space with CCE aggregation level 4 or 8 and a UE-specific search space with CCE aggregation level 1, 2, 4, or 8. The common search space and the UE-specific search space may overlap with each other.

The location of the first CCE (i.e., a CCE with the smallest index) in a PDCCH search space given to a random UE for each CCE aggregation level value may vary in each subframe depending on the UE. This is referred to as PDCCH search space hashing.

The CCEs may be distributed over the system bandwidth. Specifically, a plurality of logically consecutive CCEs may be input to an interleaver. The interleaver interleaves the input CCEs on an REG basis. Thus, frequency/time resources included in one CCE are physically distributed in the control region of a subframe in the frequency/time domain. That is, a control channel is configured on a CCE basis, but interleaving is performed on an REG basis, thereby maximizing frequency diversity and interference randomization gain.

Figure 4:
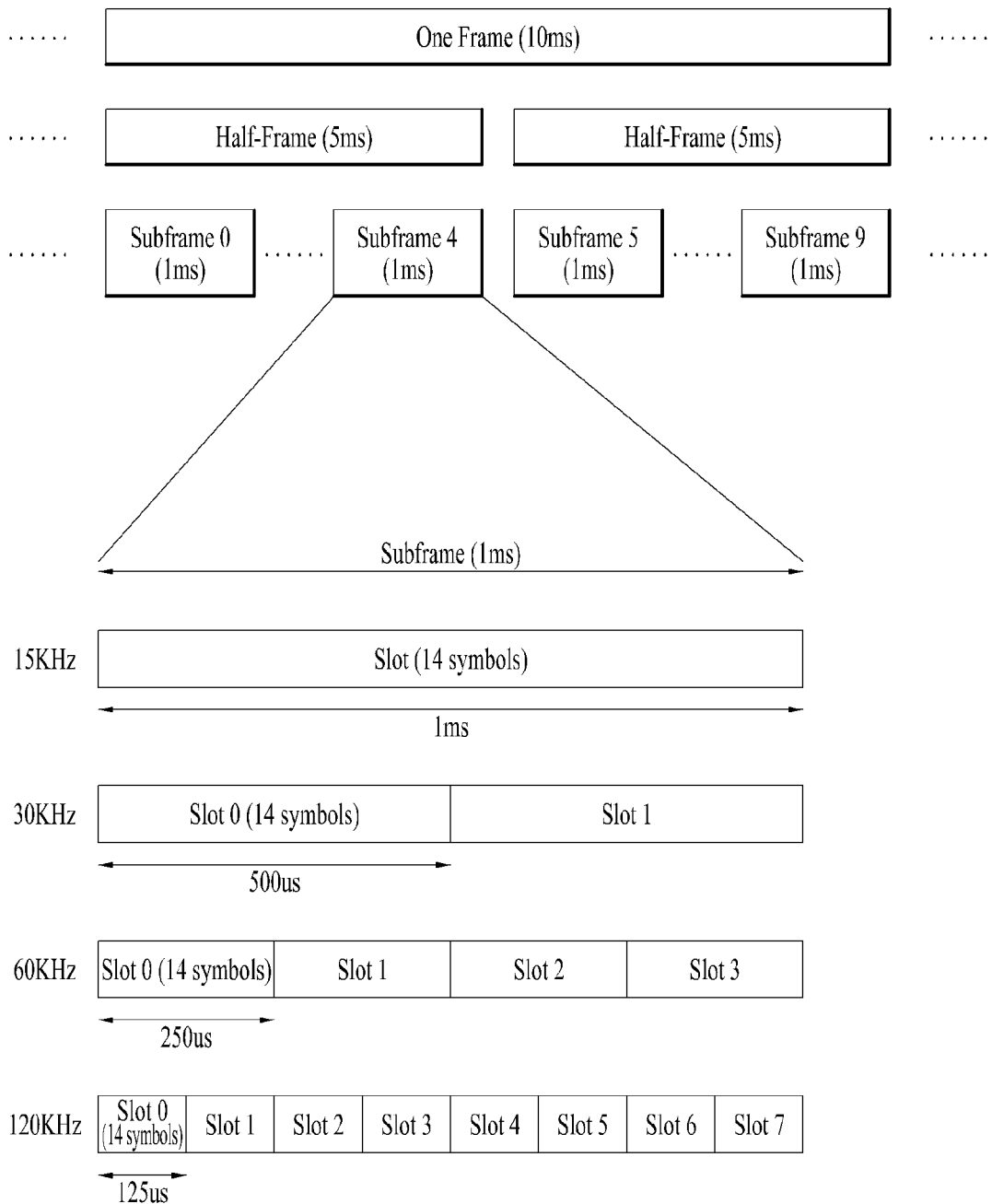
FIGS. 4 to 6 are views illustrating structures of a radio frame and slots used in a new RAT (NR) system.

FIG. 4 illustrates a structure of a radio frame used in NR.

In NR, UL and DL transmissions are configured in frames. The radio frame has a length of 10 ms and is defined as two 5 ms half-frames (HF). The half-frame is defined as five 1 ms subframes (SF). A subframe is divided into one or more slots, and the number of slots in a subframe depends on subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Here, the symbols may include OFDM symbols (or CP-OFDM symbols) and SC-FDMA symbols (or DFT-s-OFDM symbols).

[Table 2] illustrates that the number of symbols per slot, the number of slots per frame, and the number of slots per subframe vary according to the SCS when the normal CP is used.

TABLE 2

| SCS (15*2^u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{subframe,u}_{slot}$: Number of slots in a subframe
* $N^{slot}_{symb}$: Number of symbols in a slot
* $N^{frame,u}_{slot}$: Number of slots in a frame

[Table 3] illustrates that the number of symbols per slot, the number of slots per frame, and the number of slots per subframe vary according to the SCS when the extended CP is used.

TABLE 3

| SCS (15*2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the NR system, the OFDM(A) numerology (e.g., SCS, CP length, etc.) may be configured differently among a plurality of cells merged for one UE. Thus, the (absolute time) duration of a time resource (e.g., SF, slot or TTI) (referred to as a time unit (TU) for simplicity) composed of the same number of symbols may be set differently among the merged cells.

Figure 5:
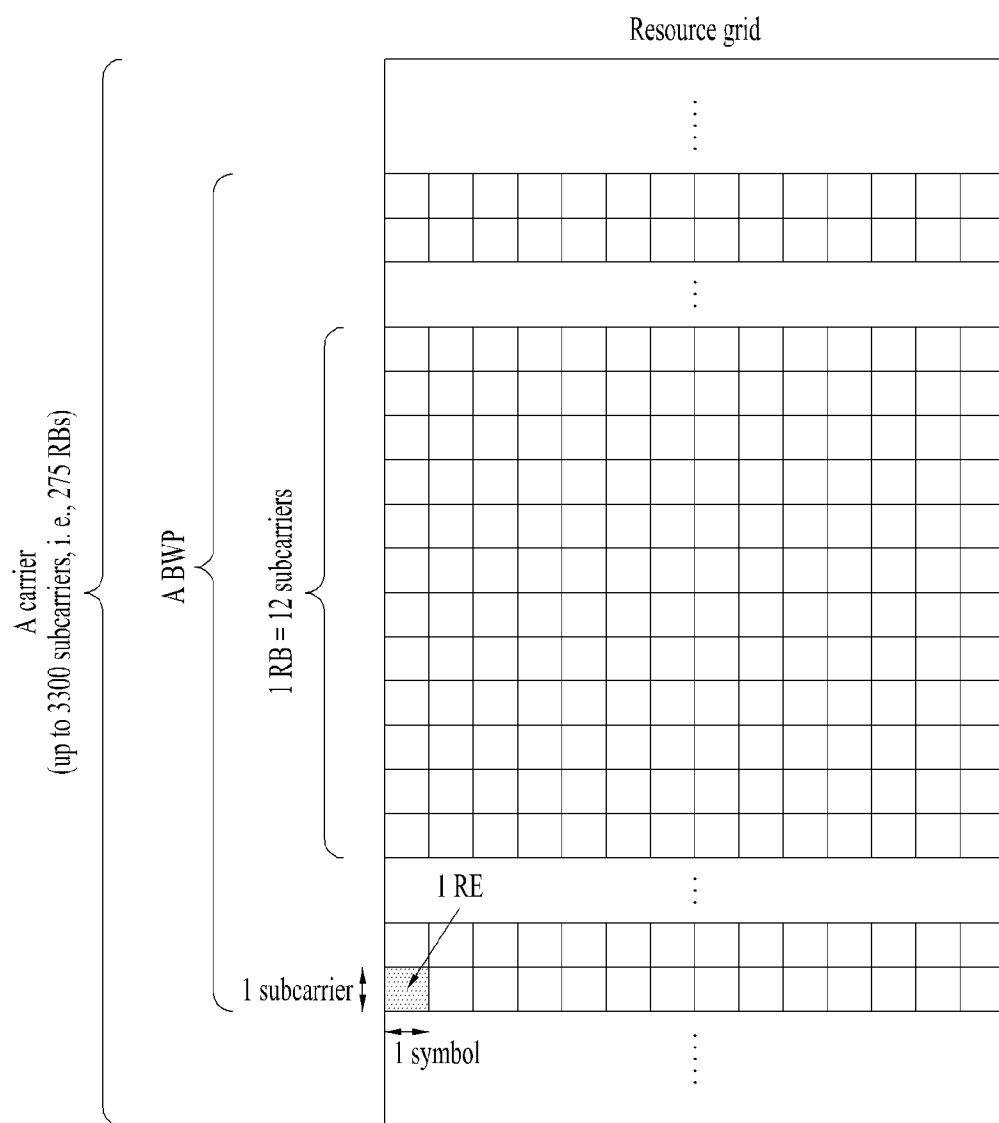

FIG. 5 illustrates a slot structure of an NR frame. A slot includes a plurality of symbols in the time domain. For example, in the case of the normal CP, one slot includes seven symbols. On the other hand, in the case of the extended CP, one slot includes six symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) is defined as a plurality of consecutive (P)RBs in the frequency domain and may correspond to one numerology (e.g., SCS, CP length, etc.). A carrier may include up to N (e.g., five) BWPs. Data communication is performed through an activated BWP, and only one BWP may be activated for one UE. In the resource grid, each element is referred to as a resource element (RE), and one complex symbol may be mapped thereto.

Figure 6:
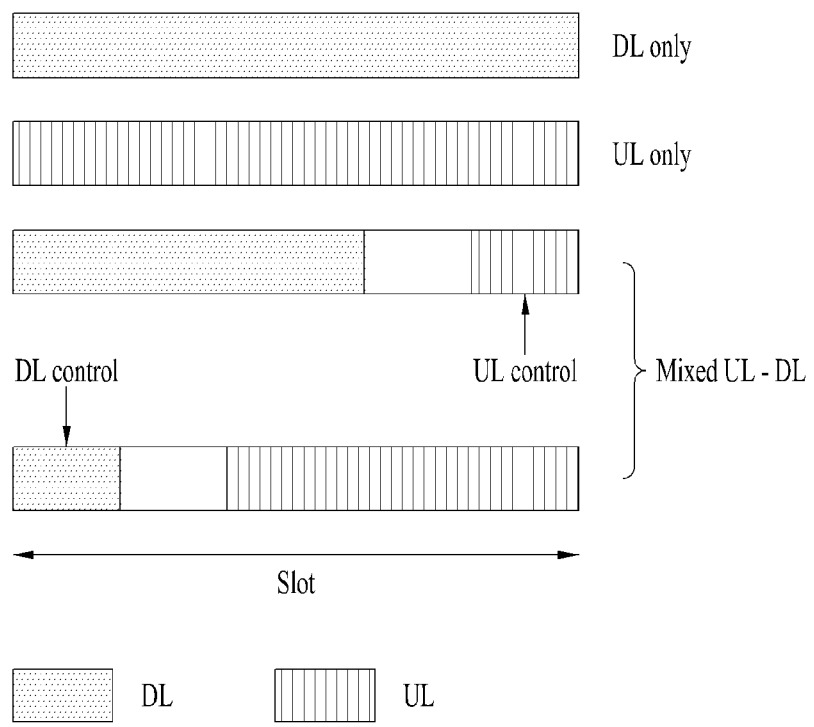

FIG. 6 illustrates a structure of a self-contained slot. In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

1. DL only configuration
2. UL only configuration
3. Mixed UL-DL configuration
   –DL region+Guard period (GP)+UL control region
   –DL control region+GP+UL region
   *DL region: (i) DL data region, (ii) DL control region+DL data region
   *UL region: (i) UL data region, (ii) UL data region+UL control region The PDCCH may be transmitted in the DL control region, and the PDSCH may be transmitted in the DL data region. The PUCCH may be transmitted in the UL control region, and the PUSCH may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. The GP provides a time gap in the process of the UE switching from the transmission mode to the reception mode or from the reception mode to the transmission mode. Some symbols at the time of switching from DL to UL within a subframe may be configured as the GP.

For a 5G mobile communication system under discussion, a technique of using an ultra-high frequency band, that is, a millimeter frequency band at or above 6 GHz is considered in order to transmit data to a plurality of users at a high transmission rate in a wide frequency band. The 3GPP calls this technique NR, and thus a 5G mobile communication system will be referred to as an NR system in the present disclosure. However, the millimeter frequency band has the frequency property that a signal is attenuated too rapidly according to a distance due to the use of too high a frequency band. Accordingly, the NR system using a frequency band at or above at least 6 GHz employs a narrow beam transmission scheme in which a signal is transmitted with concentrated energy in a specific direction, not omni-directionally, to thereby compensate for the rapid propagation attenuation and thus overcome the decrease of coverage caused by the rapid propagation attenuation. However, if a service is provided by using only one narrow beam, the service coverage of one gNB becomes narrow, and thus the gNB provides a service in a wideband by collecting a plurality of narrow beams.

As a wavelength becomes short in the millimeter frequency band, that is, millimeter wave (mmW) band, it is possible to install a plurality of antenna elements in the same area. For example, a total of 100 antenna elements may be installed at (wavelength) intervals of 0.5 lambda in a 30-GHz band with a wavelength of about 1 cm in a two-dimensional (2D) array on a 5 by 5 cm panel. Therefore, it is considered to increase coverage or throughput by increasing a beamforming gain through use of a plurality of antenna elements in mmW.

To form a narrow beam in the millimeter frequency band, a beamforming scheme is mainly considered, in which a gNB or a UE transmits the same signals with appropriate phase differences through multiple antennas, to thereby increase energy only in a specific direction. Such beamforming schemes include digital beamforming for generating a phase difference between digital baseband signals, analog beamforming for generating a phase difference between modulated analog signals by using a time delay (i.e., a cyclic shift), and hybrid beamforming using both digital beamforming and analog beamforming. If a TXRU is provided per antenna element to enable control of transmission power and a phase per antenna, independent beamforming per frequency resource is possible. However, installation of TXRUs for all of about 100 antenna elements is not effective in terms of cost. That is, to compensate for rapid propagation attenuation in the millimeter frequency band, multiple antennas should be used, and digital beamforming requires as many RF components (e.g., digital to analog converters (DACs), mixers, power amplifiers, and linear amplifiers) as the number of antennas. Accordingly, implementation of digital beamforming in the millimeter frequency band faces the problem of increased cost of communication devices. Therefore, in the case where a large number of antennas are required as in the millimeter frequency band, analog beamforming or hybrid beamforming is considered. In analog beamforming, a plurality of antenna elements are mapped to one TXRU, and the direction of a beam is controlled by an analog phase shifter. A shortcoming with this analog beamforming scheme is that frequency selective beamforming (BF) cannot be provided because only one beam direction can be produced in a total band. Hybrid BF stands between digital BF and analog BF, in which B TXRUs fewer than Q antenna elements are used. In hybrid BF, the directions of beams transmittable at the same time is limited to or below B although the number of beam directions is different according to connections between B TXRUs and Q antenna elements.

Digital BF performs signal processing on a digital baseband signal that is to be transmitted or is received as mentioned above, and therefore it may transmit or receive signals in multiple directions at the same time using multiple beams. In contrast, analog BF performs beamforming with a received analog signal or an analog signal to be transmitted in a modulated state, and therefore it cannot simultaneously transmit or receive signals in multiple directions beyond the range covered by one beam. In general, a gNB communicates with multiple users at the same time using broadband transmission or multi-antenna characteristics. When the gNB uses analog or hybrid BF and forms an analog beam in one beam direction, the gNB is allowed to communicate only with users included in the same analog beam direction due to the characteristics of analog BF. A RACH resource allocation scheme and a scheme of resource utilization in the gNB according to the present invention to be described later are proposed in consideration of constraints resulting from the characteristics of analog BF or hybrid BF.

Figure 7:
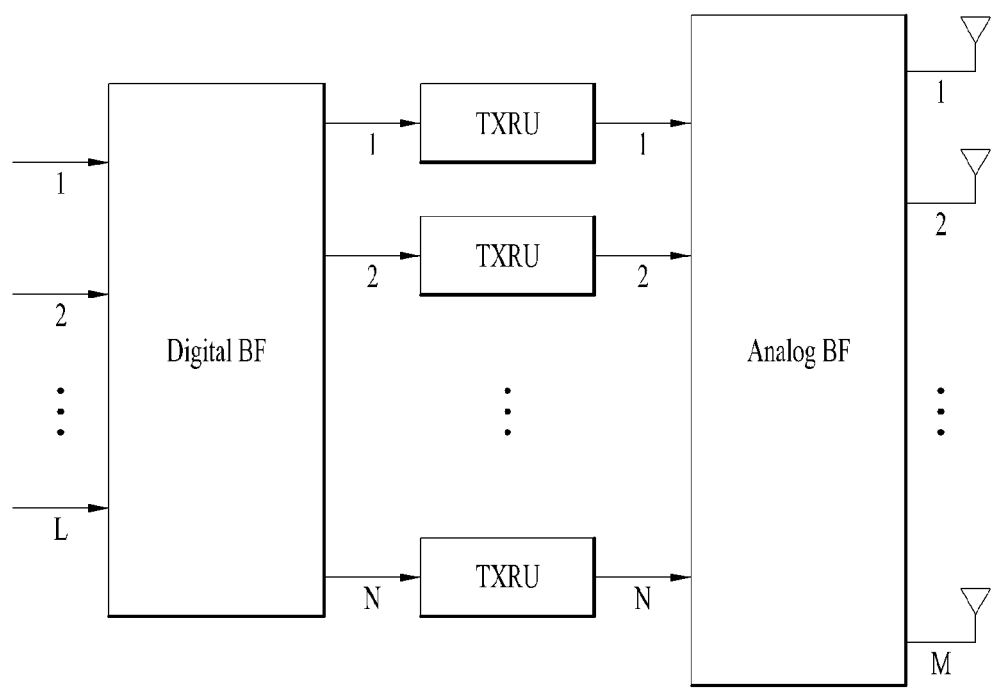
FIG. 7 shows an exemplary slot structure usable for a New Radio access technology (NR).

FIG. 7 abstractly illustrates a hybrid beamforming structure in terms of TXRUs and physical antennas.

For the case where multiple antennas are used, hybrid BF with digital BF and analog BF in combination has emerged. Analog BF (or RF BF) is an operation of performing precoding (or combining) in an RF unit. Due to precoding (combining) in each of a baseband unit and an RF unit, hybrid BF offers the benefit of performance close to the performance of digital BF, while reducing the number of RF chains and the number of DACs (or analog to digital converters (ADCs). For the convenience' sake, a hybrid BF structure may be represented by N TXRUs and M physical antennas. Digital BF for L data layers to be transmitted by a transmission end may be represented as an N-by-N matrix, and then N converted digital signals are converted to analog signals through TXRUs and subjected to analog BF represented as an M-by-N matrix. In FIG. 7, the number of digital beams is L, and the number of analog beams is N. Further, it is considered in the NR system that a gNB is configured to change analog BF on a symbol basis so as to more efficiently support BF for a UE located in a specific area. Further, when one antenna panel is defined by N TXRUs and M RF antennas, introduction of a plurality of antenna panels to which independent hybrid BF is applicable is also considered. As such, in the case where a gNB uses a plurality of analog beams, a different analog beam may be preferred for signal reception at each UE. Therefore, a beam sweeping operation is under consideration, in which for at least an SS, system information, and paging, a gNB changes a plurality of analog beams on a symbol basis in a specific slot or SF to allow all UEs to have reception opportunities.

Figure 8:
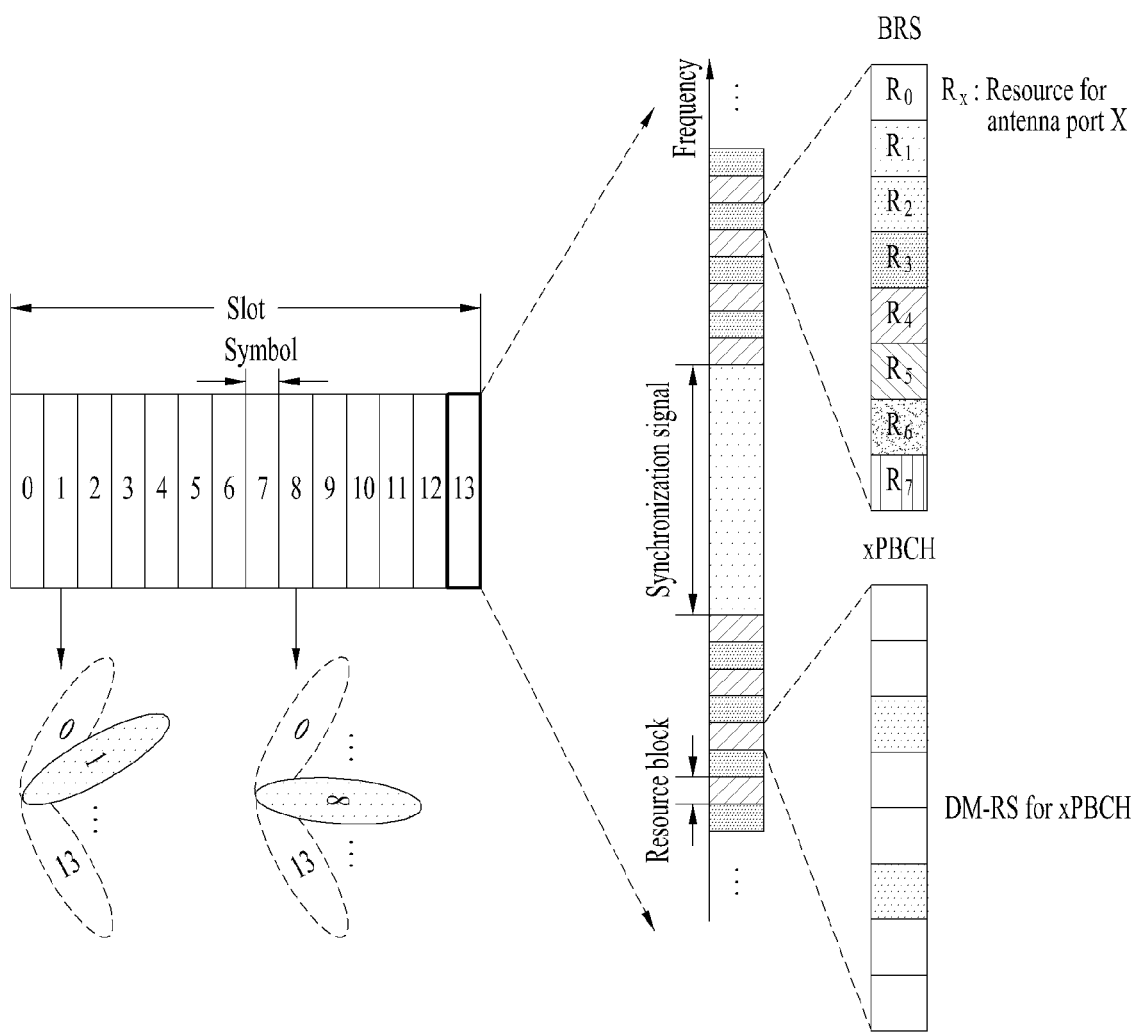
Figure 9:
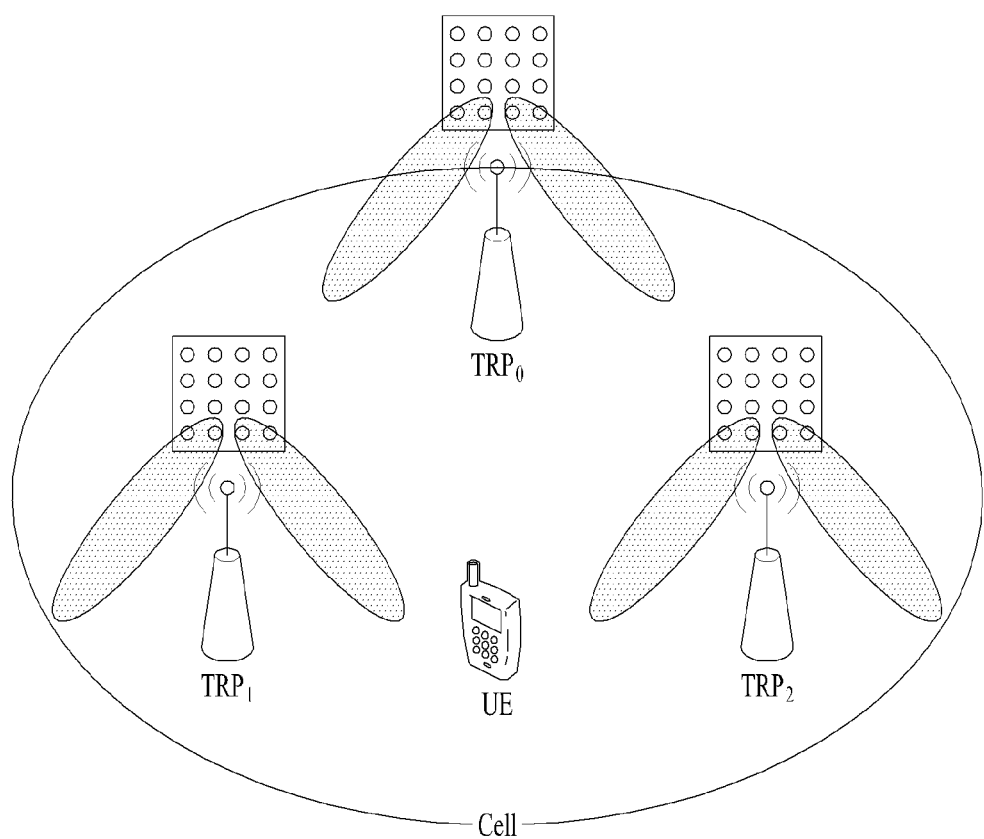
FIG. 9 is a view illustrating beam sweeping for a synchronization signal and system information during downlink (DL) transmission.

FIG. 8 is a view illustrating beam sweeping for an SS and system information during DL transmission. In FIG. 9, physical resources or a physical channel which broadcasts system information of the new RAT system is referred to as an xPBCH. Analog beams from different antenna panels may be transmitted simultaneously in one symbol, and introduction of a beam reference signal (BRS) transmitted for a single analog beam corresponding to a specific antenna panel as illustrated in FIG. 9 is under discussion in order to measure a channel per analog beam. BRSs may be defined for a plurality of antenna ports, and each antenna port of the BRSs may correspond to a single analog beam. Unlike the BRSs, the SS or the xPBCH may be transmitted for all analog beams included in an analog beam group so that any UE may receive the SS or the xPBCH successfully.

FIG. 9 is a view illustrating an exemplary cell in the NR system.

Referring to FIG. 9, compared to a wireless communication system such as legacy LTE in which one eNB forms one cell, configuration of one cell by a plurality of TRPs is under discussion in the NR system. If a plurality of TRPs form one cell, even though a TRP serving a UE is changed, seamless communication is advantageously possible, thereby facilitating mobility management for UEs.

Compared to the LTE/LTE-A system in which a PSS/SSS is transmitted omni-directionally, a method for transmitting a signal such as a PSS/SSS/PBCH through BF performed by sequentially switching a beam direction to all directions at a gNB applying mmWave is considered. The signal transmission/reception performed by switching a beam direction is referred to as beam sweeping or beam scanning. In the present disclosure, "beam sweeping" is a behavior of a transmission side, and "beam scanning" is a behavior of a reception side. For example, if up to N beam directions are available to the gNB, the gNB transmits a signal such as a PSS/SSS/PBCH in the N beam directions. That is, the gNB transmits an SS such as the PSS/SSS/PBCH in each direction by sweeping a beam in directions available to or supported by the gNB. Or if the gNB is capable of forming N beams, the beams may be grouped, and the PSS/SSS/PBCH may be transmitted/received on a group basis. One beam group includes one or more beams. Signals such as the PSS/SSS/PBCH transmitted in the same direction may be defined as one SS block (SSB), and a plurality of SSBs may exist in one cell. If a plurality of SSBs exist, an SSB index may be used to identify each SSB. For example, if the PSS/SSS/PBCH is transmitted in 10 beam directions in one system, the PSS/SSS/PBCH transmitted in the same direction may form an SSB, and it may be understood that 10 SSBs exist in the system. In the present disclosure, a beam index may be interpreted as an SSB index.

Hereinafter, a DCI transmission and reception method according to the present disclosure will be described with reference to the following embodiments.

In the 5G NR system, information transmission and reception methods capable of achieving ultra-low latency and ultra-high reliability are considered. To this end, a method of efficiently providing services for various target quality of service (QoS) requirements may be required. The corresponding target QoS requirements need to be configured based on the latency and/or reliability, and a UE also needs to perform data decoding and HARQ-ACK transmission in a different way for each target QoS requirement.

Accordingly, the present disclosure proposes a method of transmitting and receiving DCI for data with different target QoS requirements in a communication system designed for latency reduction and reliability improvement.

The subjects and/or embodiments of the present disclosure may be considered as a proposed method, and a combination of the subjects and/or embodiments may also be considered as a new proposed method for implementing the present disclosure. In addition, the subjects of the present disclosure are not limited to the embodiments thereof or specific systems.

Hereinafter, a description will be given of the overall operations of a UE and a BS according to the present disclosure with reference to FIGS. 10 to 12.

Figure 10:
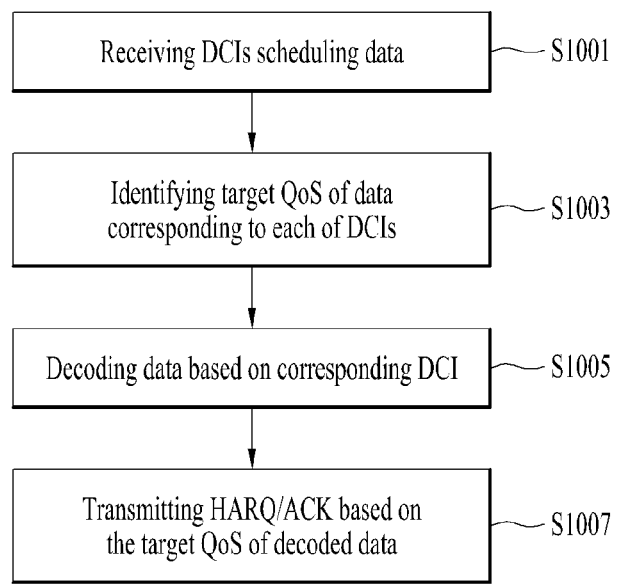
FIG. 10 is a view illustrating an exemplary cell in an NR system.
Figure 11:
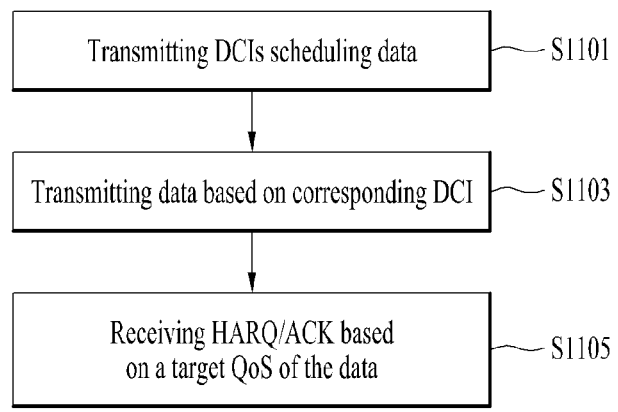

FIG. 10 is a diagram for explaining the operation of the UE according to the present disclosure. Referring to FIG. 10, the UE receives DCIs scheduling data with different target QoS requirements from the BS (S1001). The UE identifies the target QoS requirement of data scheduled by each of the DCIs based on each of the DCIs (S1003). How the UE identifies the target QoS requirement of the data scheduled by each of the DCIs will be described in detail with reference to the embodiments of the present disclosure. That is, the present disclosure will describe a method of identifying data with a different target QoS requirement based on corresponding DCI. Accordingly, the UE may identify the target QoS requirement scheduled by each of the DCIs in step S1003 according to the embodiments of the present disclosure. After identifying the target QoS requirement corresponding to the data, the UE receives the data scheduled by each of the DCIs and decodes the received data (S1005). The UE transmits a HARQ-ACK signal to the BS according to decoding results based on the target QoS requirement of the data. In other words, if the decoding results of the data satisfy the target QoS requirement of the corresponding data, the UE may transmit an ACK signal. Otherwise, the UE may transmit a NACK signal (S1007).

The operation of the BS according to the present disclosure will be described with reference to FIG. 11. Referring to FIG. 11, the BS transmits DCIs scheduling data with different target QoS requirements to the UE (S1101). The BS transmits data according to scheduling in each of the DCIs to the UE (S1103) and receives a HARQ-ACK signal transmitted from the UE based on the target QoS requirement of the data. In step S1101, each of the DCIs may be used to identify the target QoS requirement of the corresponding data. How the target QoS requirement of the data is identified based on each of the DCIs will be described in detail with reference to the embodiments of the present disclosure.

Figure 12:
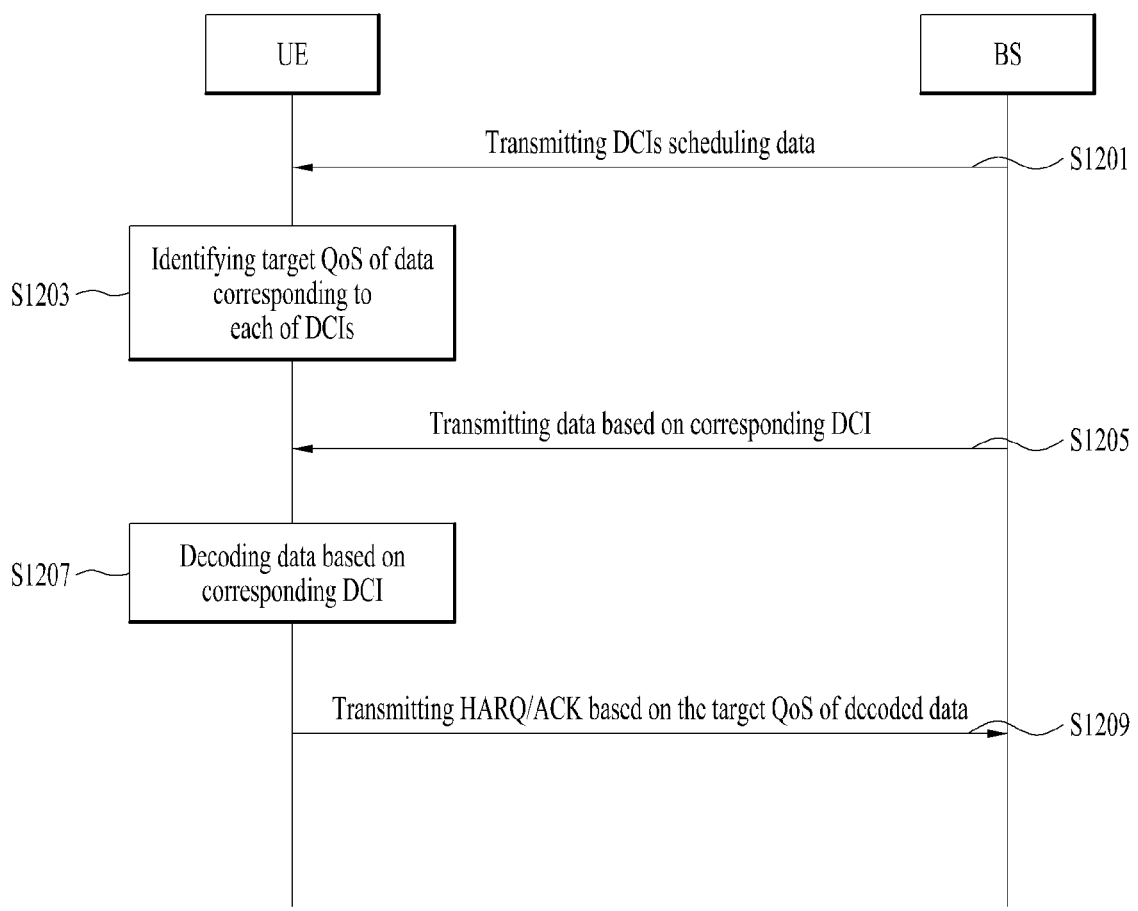

The above operations are summarized from the perspective of the network with reference to FIG. 12. When the BS transmits DCIs scheduling data with different target QoS requirements to the UE (S1201), the UE identifies the target QoS requirements of the data based on the received DCIs (S1203). In this case, the UE may identify the target QoS requirement of each piece of data according to the following embodiments of the present disclosure as described above. Thereafter, the BS transmits data according to scheduling in corresponding DCI (S1205). Upon receiving the data, the UE decodes the data (S1207) and transmits a HARQ-ACK signal to the BS based on the target QoS requirement. That is, if the decoding result of the received data satisfies the target QoS requirement thereof, the UE transmits an ACK signal. Otherwise, the UE transmits a NACK signal (S1209).

Hereinafter, a description will be given of a method of identifying the target QoS requirement of data scheduled by each DCI, which is to implement the operations of the UE and BS described above in FIGS. 10 to 12.

DCIs for data with different target QoS requirements may be transmitted with the same periodicity or with different periodicities. In addition, all of the DCIs for the data with the different target QoS requirements may be transmitted at every transmission time, instead of configuring the periodicities thereof.

For example, when the BS transmits DCI over a control channel, the BS may transmit the DCI with different periodicities depending on the target QoS requirement of data assigned by the corresponding DCI. When the BS configures a control RB set for transmitting DCI to the UE over a control channel, the BS may transmit the DCI in the corresponding control RB set with different periodicities depending on the target QoS requirement of data assigned by the corresponding DCI. This operation may be configured by the BS for the UE through higher layer signaling and/or physical layer signaling.

For example, the BS may primarily configure the time and/or periodicity for DCI monitoring through higher layer signaling, regardless of target QoS requirements. Then, the BS may secondarily configure the times and/or periodicities for monitoring DCIs scheduling data with different target QoS requirements through DCI transmitted on a control channel at a specific time. Herein, the time may refer to a monitoring start time. In addition, the time and/or periodicity of performing the DCI monitoring, which is primarily transmitted, may be predefined in the system.

Further, the DCIs scheduling the data with the different target QoS requirements may be configured to be transmitted at the same time and/or with the same periodicity. Alternatively, it may be defined in the system that the DCIs are transmitted at every transmission time without configuring the periodicities thereof.

When the DCIs scheduling the data with the different target QoS requirement are configured to have different transmission times and/or different transmission periodicities, the UE may implicitly know the target QoS requirement of data scheduled by specific DCI based on the time and/or periodicity of receiving the corresponding DCI. In addition, the UE may determine a HARQ timing based on the corresponding target QoS requirement and transmit a HARQ-ACK at the determined HARQ timing. That is, the HARQ timing may vary depending on the target QoS requirement and the reliability and latency required therefor.

In addition to configuring the time and/or periodicity as described above, each of the DCIs scheduling the data with the different target QoS requirements may be configured to be transmitted separately for each subframe, each subframe set, each sTTI, and/or each sTTI set. Such a configuration may be predefined in the system or provided by the BS to the UE through higher layer signaling and/or physical layer signaling. For example, assuming that sTTI indices are indexed on a subframe basis, one subframe includes a total of 6 sTTIs, and there are three different types of DCIs scheduling data with three different types of target QoS requirements, each of the three different types of DCIs may correspond to each sTTI set obtained by grouping the 6 sTTIs into three sets as follows: {#0, #4}, {#1, #3, #5}, and {#2}. In the present disclosure, a transmission periodicity may refer to a DCI monitoring periodicity.

The transmission times of the DCIs scheduling the data with the different target QoS requirements may overlap. That is, even when the DCIs for the data with the different target QoS requirements have different transmission periodicities, the transmission times of the DCIs may overlap at each time corresponding to a common multiple of the transmission periodicities. In addition, the transmission times of the DCIs for the data with the different target QoS requirements may overlap not only when the DCIs have different periodicities but also when the DCIs are configured to have the same periodicity or be transmitted at every transmission time without configuring the transmission periodicities.

In this case, the UE needs to apply a different HARQ timing to each target QoS requirement in order to transmit a HARQ-ACK at a specific HARQ timing. Thus, a method of recognizing the target QoS requirement of data scheduled by DCI received at a specific time is required.

The DCIs scheduling the data with the different target QoS requirements may be transmitted in one control RB set. In this case, if the DCIs scheduling the data are defined to have different bit sizes depending on the target QoS requirements of the data, the target QoS requirements of the data scheduled by the DCIs may be obtained by blind decoding (BD).

On the other hand, when the DCIs scheduling the data have the same bit size independently of the target QoS requirements, a flag may be included in DCI to identify the target QoS requirement of data scheduled by the corresponding DCI. By doing so, the target QoS requirements of the data scheduled by the DCIs may be indicated.

As another method, when the DCIs scheduling the data with the different target QoS requirements have the same bit size and when the DCIs need to be monitored at the same time, decoding may be performed on the assumption that received DCI is one of the DCIs scheduling the data with the different target QoS requirements. For example, the UE may attempt decoding by assuming that received DCI is DCI scheduling data with a stricter target QoS requirement.

As another example, when the BD is performed for DCIs scheduling data with stricter and less strict target QoS requirements, if the same hashing function is used and if three and six BD candidates are respectively allocated to the DCIs at a specific aggregation level (AL), decoding may be performed by assuming one of the two DCIs for overlapping BD candidate(s). For example, the decoding may be performed by assuming the DCI scheduling the data with the stricter target QoS requirement for the overlapping BD candidate(s). The aforementioned BD candidate may refer to a PDCCH candidate corresponding to a region in which a PDCCH including DCI is capable of being transmitted.

In addition, when the DCIs scheduling the data with the different target QoS requirements are decoded, if the same hashing function is used, a parameter applied to the corresponding hashing function may be changed. That is, the parameter used for the hashing function may be configured differently depending on DCI. Alternatively, an offset may be applied to specific DCI depending on DCI types.

For example, assuming that a C-RNTI is applied to the hashing function, the C-RNTI may be used when the BD is performed for DCI scheduling data with a less strict target QoS requirement. When the BD is performed for DCI scheduling data with a stricter target QoS requirement, a specific offset may be applied to the C-RNTI. The parameter and/or offset may be predefined in the system or provided by the BS to the UE through higher layer signaling and/or physical layer signaling. As a further method, different hashing functions may be respectively defined for the DCIs scheduling the data with the different target QoS requirements.

In the present disclosure, the DCIs scheduling the data with the different target QoS requirements may have different types or formats. For example, DCI scheduling data with a stricter target QoS requirement may be DCI scheduling data in a sTTI, and DCI scheduling data with a less strict target QoS requirement may be DCI scheduling data in a TTI.

In another embodiment of the present disclosure, the UE may be allocated a different RNTI depending on the target QoS requirement of data. That is, the BS may transmit DCI using a different RNTI depending on the target QoS requirement of data, and thus the UE may identify the target QoS requirement corresponding to the DCI.

In addition, ALs for the BD in an RB set may be configured differently depending on the target QoS requirement of data.

For example, DCI scheduling data with a strict target QoS requirement may be transmitted with high reliability. Accordingly, when the ALs in the control RB set are set to [1, 2, 4, 8], ALs [1, 2] may be allocated for the BD of DCI scheduling data with a less strict target QoS requirement, and ALs [4, 8] may be allocated for the BD of DCI scheduling data with a stricter target QoS requirement. Such a configuration may be predefined in the system or provided by the BS to the UE through higher layer signaling and/or physical layer signaling.

As the application of the above method, a specific AL may be shared between DCIs scheduling data with stricter and less strict target QoS requirements. For example, ALs [1, 2, 4] may be allocated for the BD of DCI scheduling data with a less strict target QoS requirement, and ALs [4, 8] may be allocated for the BD of DCI scheduling data with a stricter target QoS requirement. Thus, AL 4 may be shared by the two DCIs.

In this case, BD candidates corresponding to the shared AL may be separately allocated to each of the DCIs.

For example, when 6 BD candidates are allocated for AL 4, some of the BD candidates, for example, the first four BD candidates may be allocated for the BD of the DCI scheduling the data with the less strict target QoS requirement, and the last two BD candidates may be allocated for the BD of the DCI scheduling the data with the stricter target QoS requirement. Such a configuration may be predefined in the system or provided by the BS to the UE through higher layer signaling and/or physical layer signaling.

As the application of the above-described embodiment, all ALs may be shared between DCIs scheduling data with stricter and less strict target QoS requirements, and BD candidates may be separately allocated to each of the DCIs.

In other words, each of the DCIs scheduling the data with the stricter and less strict target QoS requirements may have a different search space.

When the search spaces of the DCIs scheduling the data with the stricter and less strict target QoS requirements are configured, the search spaces may be configured separately in different physical regions within the same RB set.

Further, ALs and/or the number of BD candidates per AL applied only when the DCIs scheduling the data with the different target QoS requirements are transmitted at the same time may be separately configured. For example, when the DCIs scheduling the data with the different target QoS requirements are transmitted together in the same control RB set, each of the DCIs may have a different transmission periodicity, and ALs and/or the number of BD candidates per AL may be configured for each transmission periodicity.

In this case, ALs and/or the number of BD candidates per AL applied when the transmission times of the DCIs overlap may be configured separately in consideration of the BD capability of the UE. Such a configuration may be provided by the BS to the UE through higher layer signaling and/or physical layer signaling. The BD capability of the UE may be defined by the maximum number of times that the UE is capable of performing the BD within a specific period. For example, the BD capability of the UE may be defined as follow: the BD is performed 44 times in every 14 symbols. The BD capability of the UE may be reported to the BS for the purpose of configuring an AL, an AL set, the number of BD candidates per AL, and/or the number of repeated candidates for each of the DCIs scheduling the data with the different target QoS requirements.

As a further method, the BS may configure a control RB set in which DCI is transmitted differently for each of the target QoS requirements of the data. Thus, based on a control RB set in which successfully decoded DCI is transmitted, the UE may implicitly know the target QoS requirement of data scheduled by the corresponding DCI. When the BS configures a control RB set, the BS may indicate the target QoS requirement of data scheduled by DCI included in the corresponding control RB set and also configure a different AL for each control RB set.

For example, a minimum AL configured for a control RB set in which DCI scheduling data with a less strict target QoS requirement is transmitted may be set to a relatively small value, and a minimum AL configured for a control RB set in which DCI scheduling data with a stricter target QoS requirement is transmitted may set to a relatively large value.

The subjects of the present disclosure are not limited to what has been described hereinabove. That is, the present disclosure may be applied not only when the transmission times of the DCIs for the data with the different target QoS requirements overlap but also to all cases regardless thereof. The subjects of the present disclosure may be applied when the DCIs for the data with the different target QoS requirements are transmitted with different periodicities or with the same periodicity. In addition, the subjects of the present disclosure may be applied when the DCIs are transmitted at every transmission time without configuring the periodicities thereof. In the present disclosure, DCIs scheduling data with less strict and stricter target QoS requirements may respectively refer to DCI for legacy traffic and DCI for URLLC traffic. Alternatively, DCI may refer to traffic separated based on target QoS requirements in the URLLC traffic.

In the case of DCI transmitted over a control channel or in a control RB set configured in the control channel, a method of repeatedly transmitting multiple DCIs and combining the repeatedly transmitted DCIs may be considered for high-reliability transmission.

To this end, a chase combining (CC) scheme or an incremental redundancy (IR) scheme may be applied. When combining is performed based on the IR scheme, DCI candidates where different redundancy versions (RVs) are applied to parity bits may be combined.

In this case, an RV value applied to DCI may be provided by the BS to the UE through higher layer signaling and/or physical layer signaling. Alternatively, the RV value applied to the DCI may be implicitly indicated by matching the RV value to the index of a BD candidate of the DCI.

For example, when the index of the BD candidate of the DCI is 0, the RV value may be recognized as 0. When the index of the BD candidate of the DCI is 1, the RV value may be recognized as 1. The matching relation between the index of the BD candidate of the DCI and the RV value may be predefined in the system or provided by the BS to the UE through higher layer signaling and/or physical layer signaling.

For example, an RV corresponding to a value obtained by applying the modulo operation between the BD candidate index and the total number of RVs supported in the system may be applied to the corresponding BD candidate. Alternatively, a predetermined RV order (e.g., RV 0, RV 2, RV 3, and RV 1) may be matched with the order of values obtained by applying the modulo operation between the BD candidate index and the total number of RVs supported in the system.

The number of BD candidates repeatedly transmitted for combining, that is, the repetition number of BD candidates may be predefined in the system or provided by the BS to the UE through higher layer signaling and/or physical layer signaling. The repetition number may be configured differently for each AL, and the repetition number may mean the maximum number of possible repetitions. This method may be applied to BD candidates defined for each AL. Multiple BD candidates to be combined may be transmitted in the same control RB set or in different control RB sets. However, when the BD candidates transmitted in the different control RB sets are indexed separately for each control RB set, DCIs detected from BD candidates with the same BD candidate index may be combined.

In this case, the RV value applied to the DCI may be matched with a combination of information about the index of the corresponding BD candidate and/or a control RB set in which the corresponding BD candidate is transmitted and then implicitly provided to the UE.

The DCI repetition may be applied to BD candidates transmitted at the same time or BD candidates transmitted at different times.

When the DCI repetition is applied to BD candidates transmitted at different times, DCI may be divided into a plurality of segmentations, and the segmentations may be transmitted on a plurality of BD candidates.

For example, coded bits obtained by encoding a single piece of DCI may be distributedly mapped to multiple different BD candidates. In this case, the multiple BD candidates for transmitting the single piece of DCI may be selected from BD candidates transmitted at the same time or BD candidates transmitted at different times.

When the multiple BD candidates are selected from among the BD candidates transmitted at the same time, the multiple BD candidates may be selected from among BD candidates included in the same control RB set or BD candidates included in different control RB sets.

Further, the multiple BD candidates may be selected from a multitude of BD candidates corresponding to one AL or a multitude of BD candidates corresponding to a multitude of ALs. It is apparent that the present disclosure is not limited to the aforementioned configurations and is applicable to any combination thereof.

According to another embodiment, a single piece of DCI scheduling data may be configured differently depending on the urgency of information, and coded bits obtained by encoding the DCI separately may be transmitted distributedly on multiple BD candidates.

The following method may be used to select the multiple BD candidates.

For example, assuming that ALs {1, 2, 4, 8} are configured in one subframe unit (the subframe unit may be one transmission unit such as a TTI but the present disclosure is not limited thereto) and DCI is capable of being repeated four times in the time domain, new ALs including AL 32, which is four times greater than AL 8, i.e., the maximum AL of the subframe unit, may be configured in four subframes. That is, according to the present embodiment, ALs {1, 2, 4, 8, 16, 32} may be configured.

In other words, it may be seen that new ALs {1, 2, 4, 8, 16, 32} are configured on a four-subframe basis. The repetition value may refer to the maximum number of possible repetitions. The repetition value may be predefined in the system or configured by the BS to the UE through higher layer signaling and/or physical layer signaling.

For ALs {1, 2, 4, 8, 16, 32} in four subframes, which are a new transmission unit larger than or equal to one transmission unit, the number of BD candidates per AL may be configured. In this case, the number of BD candidates per AL may be newly defined based on the total number of BD candidates available in the new transmission unit and the ratio of each AL. For example, when 44 BD candidates are configured in each subframe, a total of 44×4 BD candidates may be used in four subframes.

The ratio of each AL may be calculated based on ALs {1, 2, 4, 8} configured in one transmission unit. When the ALs are repeated once, twice, and four times, ALs {1, 2, 4, 8}, ALs {2, 4, 8, 16}, and ALs {4, 8, 16, 32} are obtained, respectively. Thus, the ratio of ALs {1, 2, 4, 8, 16, 32} are set to {1/12, 1/6, 1/4, 1/4, 1/6, 1/12}, respectively.

Therefore, the number of BD candidates per AL may be determined as (15, 29, 44, 44, 29, 15) by multiplying 176 BD candidates available in the new transmission unit with the ratio of each of ALs {1, 2, 4, 8, 16, 32}.

Meanwhile, the new ALs in the new transmission unit may also be configured in consideration of a predetermined number of repetitions. In addition, the BD candidates may be predefined in the system or provided by the BS to the UE through higher layer signaling and/or physical layer signaling.

As described above, the combination of the subjects of the present disclosure may also be considered as a new subject of the present disclosure. For example, a monitoring periodicity, ALs, the number of BD candidates per AL, the number of times that transmission is repeated, etc. of each of the DCIs scheduling the data with the different target QoS requirements may be combined. Here, the number of times that transmission is repeated may refer to the maximum number of times that transmission is repeated. The repetition may be applied to BD candidates of DCIs transmitted at the same time or BD candidates of different DCIs.

In the case of DCI for URLLC data, the DCI may have a small size to improve reliability, thereby reducing a code rate. To this end, the allocation unit of the URLLC data may be enlarged. For example, the RBG size therefor may be larger than that for other data such as eMBB data, etc.

Regardless of the purpose of reducing the DCI size, the URLLC data may be transmitted in a short period in the time domain to reduce time delay. However, more resources may be allocated to the URLLC data in the frequency domain, and thus, the URLLC data may be transmitted based on a large RBG size. In this case, resource collision may occur more frequently when multiplexing with other data such as the eMBB data is performed. To solve such a problem, frequency resources may be divided into multiple physical regions, and a different RBG size may be configured for each region. The frequency resource configuration, i.e., the configuration of dividing frequency resources into multiple physical regions and/or the RBG size per region may be predefined in the system or provided by the BS to the UE through higher layer signaling and/or physical layer signaling.

The configuration may be configured for a specific type of data, for example, the URLLC data. Alternatively, the configuration may be configured separately for different types of data, for example, the URLLC data and the eMBB data.

For example, the URLLC data may be configured to be transmitted based on a large RBG size in a resource region where the URLLC data is mostly scheduled. On the other hand, the URLLC data may be configured to be transmitted based on a relatively small RBG size in a resource region where the URLLC data coexists the eMBB data. Here, the resource region may not be limited to a frequency region and correspond to a time region. The details of the RBG size may be equally applied to an RB size.

Figure 13:
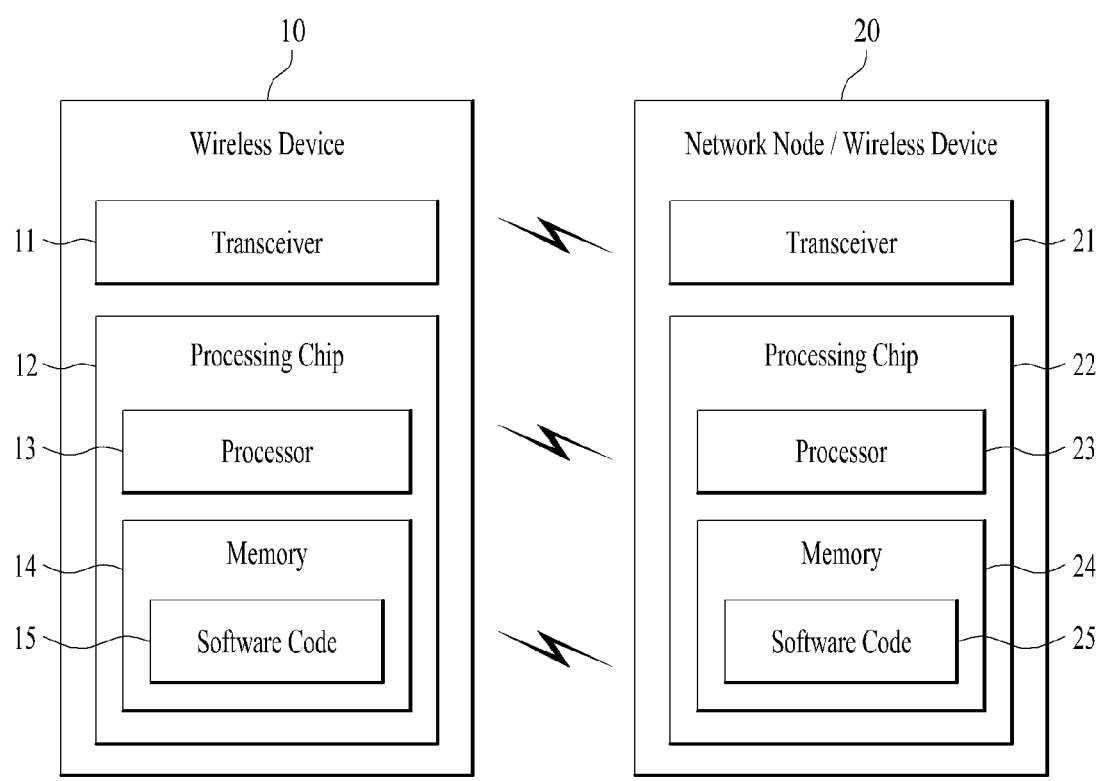
FIG. 13 is a block diagram illustrating the components of a wireless device for implementing the present disclosure.

FIG. 13 is a block diagram illustrating communication between a wireless device 10 and a network node 20. In FIG. 13, the network node 20 may be replaced with a wireless device or a UE.

In the present specification, the wireless device 10 or the network node 20 may include a transceiver 11 or 21 configured to communicate with one or more other wireless devices, network nodes, and/or other entities in the network. The transceiver 11 or 21 may include one or more transmitters, one or more receivers, and/or one or more communications interfaces.

The transceiver 11 or 21 may include one or more antennas. The antenna may be configured to transmit a signal processed by the transmitter 11 or 21 to the outside under the control of a processing chip 12 or 22 or deliver a radio signal received from the outside to the processing chip 12 or 22. The antenna may be referred to as an antenna port. Each antenna may correspond to one physical antenna or be configured by a combination of two or more physical antenna elements. A signal transmitted on each antenna may not be decomposed further at the wireless device 10 or the network node 20. An RS transmitted in relation to a corresponding antenna defines an antenna observed from the perspective of the wireless device 10 or the network node 20. Thus, the RS may allow the wireless device 10 or the network node 20 to estimate a channel for the antenna regardless of whether the channel is a single radio channel from one physical antenna or a composite channel from a plurality of physical antenna elements including the antenna. That is, an antenna is defined such that a channel for carrying a symbol on the antenna is derived from a channel for carrying another symbol on the same antenna. When a transceiver supports multi-input multi-output (MIMO) functionality capable of transmitting and receiving data on a plurality of antennas, the transceiver may be connected to two or more antennas.

In the present disclosure, the transceiver 11 or 21 may be configured to support reception beamforming and transmission beamforming. For example, the transceiver 11 or 21 may be configured to perform the functions illustrated above with reference to FIGS. 7 to 9.

The wireless device 10 or the network node 20 may include the processor chip 12 or 22. The processor chip 12 or 22 may include at least one processor such as a processor 13 or 23 and at least one memory device such as a memory 14 or 24.

The processing chip 12 or 22 may be configured to control at least one of the methods and/or processes described in the present specification. In other words, the processor chip 12 or 22 may be configured to implement at least one of the embodiments disclosed in the present specification.

The processor 13 or 23 may include at least one processor configured to execute the functions of the wireless device 10 or the network node 20 described above in the present specification.

For example, the at least one process may be configured to control the transceiver 11 or 21 in FIG. 13 to transmit and receive information.

The processor 13 or 23 included in the processing chip 12 or 22 may be configured to apply predetermined coding and modulation to a signal and/or data to be transmitted to the outside of the wireless device 10 or the network node 20 and transmit the signal and/or data to the transceiver 11 or 21. For example, the processor 13 or 23 may be configured to convert a data sequence to be transmitted into K layers through demultiplexing, channel coding, scrambling, and modulation. The encoded data sequence may be referred to as a codeword and be equivalent to a transport block, i.e., a data block provided by the MAC layer. One transport block (TB) is encoded as one codeword, and each codeword is transmitted to a receiver in the form of one or more layers. For frequency-up transformation, the transceiver 11 or 21 may include an oscillator. The transceiver 11 or 21 may include $N_t$ transmit antennas (where $N_t$ is a positive integer greater than or equal to 1).

The processing chip 12 or 22 may include the memory 14 or 24 configured to store data, programmable software code, and/or other information for implementing the embodiments described in the present specification.

In other words, the memory 14 or 24 may be configured to store software code 15 or 25 including commands for allowing the processor 13 or 23 to perform some or all of the processes controlled by the processor 13 or 23 in FIG. 13 or implementing the embodiments described above with reference to FIGS. 1 to 12 when being executed by the at least one processor such as the processor 13 or 23.

Specifically, the processing chip 12 of the wireless device 10 according to an embodiment of the present disclosure may be configured to receive DCIs scheduling data with different target QoS requirements from a BS.

The target QoS requirement of data scheduled by each of the DCIs may be identified based on each of the DCIs. In this case, the target QoS requirement of the data scheduled by each of the DCIs may be identified according to the above-described embodiments of the present disclosure. That is, the processing chip 12 may be configured to identify the target QoS requirement of the data scheduled by each of the DCIs according to the embodiments of the present disclosure. After identifying the target QoS requirement corresponding to the data, the processing chip 12 may be configured to receive the data scheduled by each of the DCIs and decodes the received data. The processing chip 12 may be configured to transmit a HARQ-ACK signal to the BS according to decoding results based on the target QoS requirement of the data. In other words, if the decoding results of the data satisfy the target QoS requirement of the corresponding data, the processing chip 12 may be configured to transmit an ACK signal. Otherwise, the processing chip 12 may be configured to transmit a NACK signal.

To performing decoding, the processing chip 12 may be configured to receive information on a mapping relation between BD candidate indices and RVs for DCI, detect the DCI repeatedly transmitted on a plurality of BD candidates, obtain the RV value of the DCI based on the information and the index of a blind decoding candidate in which the DCI is detected, and obtain data scheduling information by combining the DCI based on the RV value according to an IR scheme.

In this case, the mapping relation between the BD candidate indices and the RVs for the DCI may be determined according to the above-described embodiments. In addition, BD candidates for receiving the DCI and control RB sets including the BD candidates may also be determined according to the aforementioned embodiments.

The processing chip 22 of the network node 20 according to an embodiment of the present disclosure may be configured to transmit DCIs scheduling data with different target QoS requirements to a UE. The processing chip 22 may be configured to transmit data according to scheduling in each of the DCIs to the UE and receives a HARQ-ACK signal transmitted from the UE based on the target QoS requirement of the data. Each of the DCIs may be used to identify the target QoS requirement of the corresponding data. The target QoS requirement of the data may be identified based on each of the DCIs according to the above-described embodiments of the present disclosure.

The processing chip 22 may be configured to transmit information on a mapping relation between BD candidates for transmitting DCI and RVs to the UE and repeatedly transmit the DCI on BD candidates included in at least one control RB set. The processing chip 22 may be configured to determine a BD candidate for transmitting the DCI based on the RV value of the DCI and transmit the DCI based thereon.

The mapping relation between the BD candidate indices and the RVs for the DCI may be determined according to the above-described embodiments. In addition, BD candidates for receiving the DCI and control RB sets including the BD candidates may also be determined according to the aforementioned embodiments.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present disclosure may be achieved by various means, for example, hardware, firmware, software, or a combination thereof. In a hardware configuration, an embodiment of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, an embodiment of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

Although the method of transmitting and receiving DCI and apparatus therefor have been described based on the 5G NR system, the method and apparatus are applicable to various wireless communication systems as well as the 5G NR system.

The invention claimed is:

1. A method for receiving downlink control information (DCI) by a user equipment (UE) in a wireless communication system, the method comprising:
   receiving information on a mapping relation between blind decoding candidate indices and redundancy versions (RVs) for the DCI;
   detecting a DCI repeatedly transmitted on a plurality of blind decoding candidates;
   obtaining an RV value of the DCI based on the information and an index of a blind decoding candidate in which the DCI is detected; and
   obtaining data scheduling information included in the DCI based on the RV value.

2. The method of claim 1, wherein the data scheduling information is obtained by combining the repeatedly transmitted DCI based on an incremental redundancy (IR) scheme.

3. The method of claim 1, wherein the RV value is obtained based on a modulo operation between the index of the blind decoding candidate in which the DCI is detected and a number of values available for the RV value of the DCI.

4. The method of claim 1, wherein based on that the plurality of blind decoding candidates are included in a plurality of control resource block sets, the RV value is obtained by further considering information on a control resource block set in which the DCI is detected.

5. The method of claim 1, wherein a number of a plurality of blind decoding candidates for each aggregation level (AL) in a transmission unit for repeatedly transmitting the DCI is determined based on a number of transmission time intervals (TTIs) included in the transmission unit and a number of blind decoding candidates for each AL included in one TTI.

6. The method of claim 1, wherein blind decoding candidates in which the DCI is capable of being detected are determined based on target quality of service (QoS) of data scheduled by the DCI.

7. A communication device for receiving downlink control information (DCI) in a wireless communication system, the communication device comprising:
- a memory; and
- a processor connected to the memory,
- wherein the processor is configured to:
  - receive information on a mapping relation between blind decoding candidate indices and redundancy versions (RVs) for the DCI;
  - detect the DCI repeatedly transmitted on a plurality of blind decoding candidates;
  - obtain an RV value of the DCI based on the information and an index of a blind decoding candidate in which the DCI is detected; and
  - obtain data scheduling information included in the DCI based on the RV value.

8. The communication device of claim 7, wherein the data scheduling information is obtained by combining the repeatedly transmitted DCI based on an incremental redundancy (IR) scheme.

9. The communication device of claim 7, wherein the RV value is obtained based on a modulo operation between the index of the blind decoding candidate in which the DCI is detected and a number of values available for the RV value of the DCI.

10. The communication device of claim 7, wherein based on that the plurality of blind decoding candidates are included in a plurality of control resource block sets, the RV value is obtained by further considering information on a control resource block set in which the DCI is detected.

11. The communication device of claim 7, wherein a number of a plurality of blind decoding candidates for each aggregation level (AL) in a transmission unit for repeatedly transmitting the DCI is determined based on a number of transmission time intervals (TTIs) included in the transmission unit and a number of blind decoding candidates for each AL included in one TTI.

12. The communication device of claim 7, wherein blind decoding candidates in which the DCI is capable of being detected are determined based on target quality of service (QoS) of data scheduled by the DCI.

13. A method for transmitting downlink control information (DCI) by a base station in a wireless communication system, the method comprising:
- transmitting information on a mapping relation between blind decoding candidate indices and redundancy versions (RVs) for the DCI; and
- transmitting the DCI repeatedly on a plurality of blind decoding candidates,
- wherein an index of a blind decoding candidate on which the DCI is transmitted is determined based on the information and an RV value of the DCI.

14. A communication device for transmitting downlink control information (DCI) in a wireless communication system, the communication device comprising:
- a memory; and
- a processor connected to the memory,
- wherein the processor is configured to:
  - transmit information on a mapping relation between blind decoding candidate indices and redundancy versions (RVs) for the DCI; and
  - transmit the DCI repeatedly on a plurality of blind decoding candidates, and
  - wherein an index of a blind decoding candidate on which the DCI is transmitted is determined based on the information and an RV value of the DCI.

* * * * *